UNITED STATES PATENT OFFICE.

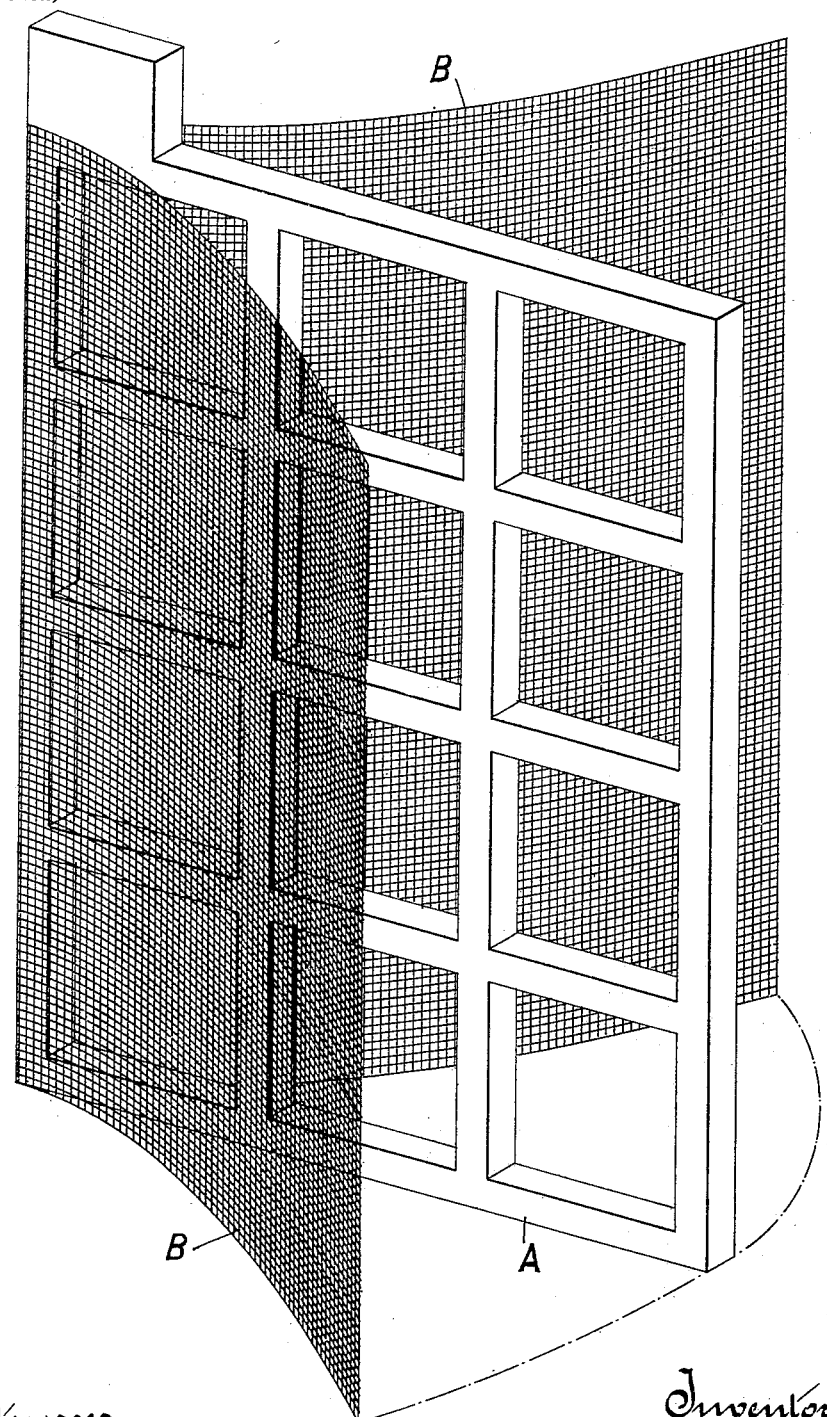

ALEXIS WERNER, OF LONDON, ENGLAND.

ELECTRIC ACCUMULATOR.

SPECIFICATION forming part of Letters Patent No. 623,195, dated April 18, 1899.

Application filed July 12, 1898. Serial No. 685,741. (No model.)

*To all whom it may concern:*

Be it known that I, ALEXIS WERNER, a resident of 44 Queens road, Peckham, London, S. E., England, have invented new and useful Improvements in Electric Accumulators, of which the following is a full, clear, and exact description, taken with the accompanying drawing, forming part hereof, which shows an electrode embodying part of my invention.

The object of this invention is to produce an accumulator wherein (a) the positive electrodes are extremely light, (b) the disaggregation of the positive material is completely avoided, (c) the electromotive force is increased in the proportion of about twenty-five per cent., and (d) the durability of the negative plate is greatly increased and the active material which it carries is more completely utilized.

For a slow discharge the positive electrodes are formed of thin sheets of galvanized iron, of copper, zinc, or any other metal (either plain or, preferably, thinly coated with lead) electroplated with an alloy formed of magnesium and cadmium with zinc, as hereinafter specified, this alloy being deposited thereon from the electrolyte during the charging of the accumulator and becoming redissolved during the discharge. The proportions of the constituent elements of the alloy will obviously depend on the electrolyte and the intensity of the current; or for a rapid discharge instead of electrodepositing the alloy very thin grids of antimony-lead or other metal unattackable by sulfuric acid may be filled with a paste formed of lead and cadmium in the spongy metallic form, in which case an electrolytic solution of less density and having consequently less electrical resistance may be employed by reason of the fact that the alloy becomes deposited from the electrolyte in charging within the pores of the said mixture and is consequently more strongly adherent than when deposited on the surface of a plate. The constituents of the electrolyte are the same in both cases, although the density of the solution is different.

The electrolyte is formed of a solution of the following salts: sulfate of zinc, sulfate of cadmium, and sulfate of magnesium, the proportions of these constituents varying with the electromotive force required.

The hydrogen formed in small quantity during the charging is occluded between the molecules of the alloy, and in all probability it combines chemically with the metals of the alloy. It is, however, to be observed that the employment of an electrolyte charged with salts, as above described, has the effect of bringing about what may be termed the "fatigue" of the negative plate, and in order to render such an electrolyte practically useful it is necessary to employ specially-constructed negative plates, as hereinafter described.

It is to be premised that the discharging capacity of the negative plate mainly depends upon the porosity of the active material and the area of the surface of contact of the active material with its support. Owing to deficient area of contact the whole of the active material can rarely be utilized, because the material in immediate contact with the support becomes discharged before the remainder of the mass, the voltage then falling to such a point that the accumulator must be considered as wholly discharged, notwithstanding that after a sufficient interval of rest the homogeneousness of the material will become restored and the voltage will rise again. Hence when the accumulator is considered as discharged to the utilizable extent it is really in part overdischarged and in part underdischarged, the one condition gradually merging into the other, so that the indication of the voltmeter must be considered as a mean of the whole. The part of the active material adjacent to the support being overdischarged becomes in time sulfated, and this principally by reason of deficient contact-surface with the support, the result being to ultimately render the whole plate useless, notwithstanding that the remainder of the active material may be still in the form of peroxid.

In order to enable the active material to be more completely utilized and so prolong the life of the plate, the negative plate is constructed as illustrated in the accompanying drawing, forming part of this specification. The conductive support A is constituted by the combination with a grid of antimonial lead of two (or more) layers B B of open-meshed fabric made of fine lead-wire gauze, said layers B being in conductive union with the grid A by being burned thereto along one edge, both the grid and wire fabrics being electrolytically peroxidized to a superficial extent by being subjected to the Planté "forming" operation.

The union of the lead-wire fabrics with the grid along one edge only admits of separating them like the leaves of a book, as shown in the drawing, for the purpose of filling the paste of active material into the cells of the grid and embedding the fabrics of lead wire in a further quantity of active material applied on the opposite faces of the grid, the said fabrics being closed against the grid and the whole consolidated by very heavy pressure.

The cells of the grid may be very large, since they are closed in on both sides by the lead-wire fabrics embedded in the active material, the lead-wire fabrics serving both to retain the active material in the cells of the grid and to insure ample conductive contact-surface between the active material and its support.

The active material is constituted of lead peroxid, with the addition of some minium and a relatively considerable proportion of an agglomerating material soluble in water, such as sugar or gum-arabic mixed in a state of powder with the pasty material, so that when it is afterward dissolved out therefrom it will leave the active material in a very porous condition. In this way I obtain a very hard highly conducting and yet very porous active material in perfect contact with its support.

I claim—

1. In an electric accumulator, the combination of an electrolyte consisting of a solution of sulfates of magnesium, cadmium and of zinc with any suitable negative and with a positive formed of a metallic support on which alloy is electrolytically deposited from such solution, as specified.

2. In an electric accumulator, the combination of an electrolyte consisting of a solution of sulfates of magnesium, cadmium and of a zinc with a positive formed of a metallic support on which alloy is electrolytically deposited from such solution and with a negative constituted of a leaden grid having covering fabrics of lead-wire gauze burned to the grid and embedded in the active material on both faces on the grid, substantially as specified.

ALEXIS WERNER.

In presence of—
COLIN C. M. GIBSON,
J. CONWAY.